Nov. 1, 1966  R. A. ENTRIKIN  3,282,614
COUPLING DEVICE
Filed Oct. 10, 1963

INVENTOR.
Raymond A. Entrikin
BY Dybvig & Dybvig
His Attorneys

3,282,614
COUPLING DEVICE
Raymond A. Entrikin, East Liverpool, Ohio, assignor to Patterson Industries, Inc., East Liverpool, Ohio, a corporation of Ohio
Filed Oct. 10, 1963, Ser. No. 315,146
2 Claims. (Cl. 287—114)

This invention relates to coupling devices and more particularly to devices for coupling various types of drive and driven shafts, such as mixer shafts, propeller shafts and so forth.

An object of this invention is to provide a shaft coupling device which may be simply assembled and disasembled.

Another object of this invention is the provision of a shaft coupling device in which a simple clamp mechanism centers a shaft with respect to a predetermined axis utilizing a screw type clamp actuator.

A more specific object of this invention is to provide a shaft coupling device utilizing a simple clamping member which may be easily assembled and disassembled and relying upon a simple screw clamp actuator in which the shaft to be coupled, once centered with the clamp, will remain centered, even though the shaft and the coupling may not be made to close tolerances.

Other objects and advantages reside in the construction of parts, the combination thereof, the method of manufacture and the mode of operation, as will become more apparent from the following description.

Referring to the drawings.

Figure 1:
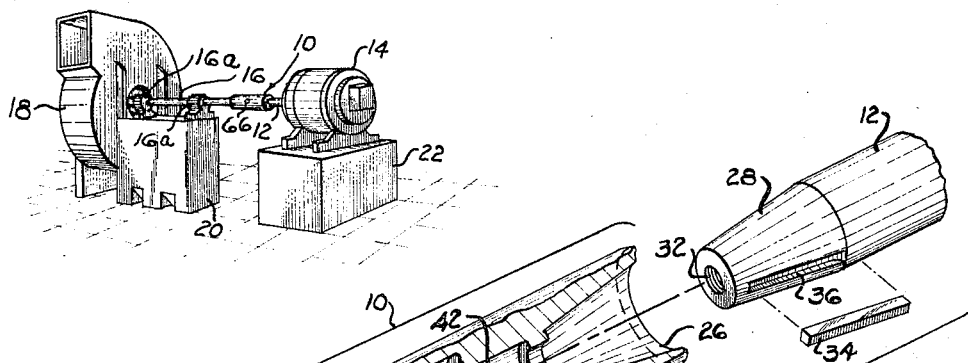
FIGURE 1 is a perspective view of mechanism employing a shaft coupling made in accordance with this invention.

Referring to the drawings in greater detail, a shaft coupling device, generally designated 10 is, shown in FIGURE 1 connecting a drive shaft 12 of a motor 14 to a driven shaft 16 for a heavy industrial blower 18. As conventional, the shaft 16 may be journalled in bearings 16a on a support member 20, and the motor 14 mounted upon a support member 22. The installation shown in FIGURE 1 may be considered typical of installations in which shaft coupling devices 10 made in accordance with this invention may be employed. As will be apparent below, shaft coupling devices 10 made in accordance with this invention may be easily disassembled and, thus, may advantageously be used wherever shafts are to be frequently disconnected.

Figure 2:
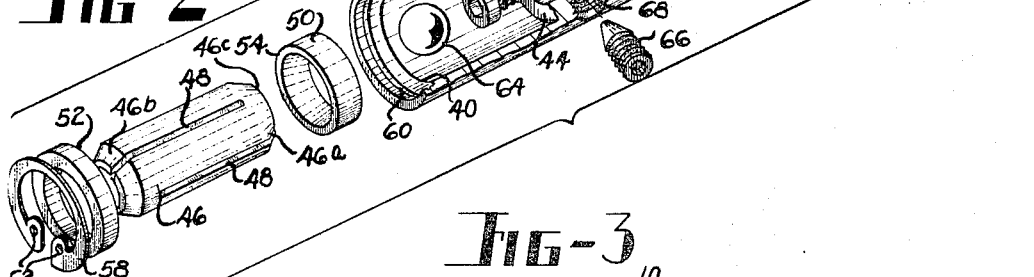
FIGURE 2 is an exploded perspective view with portions cut away of a shaft coupling device made in accordance with this invention and a drive shaft to be connected thereto.
Figure 3:
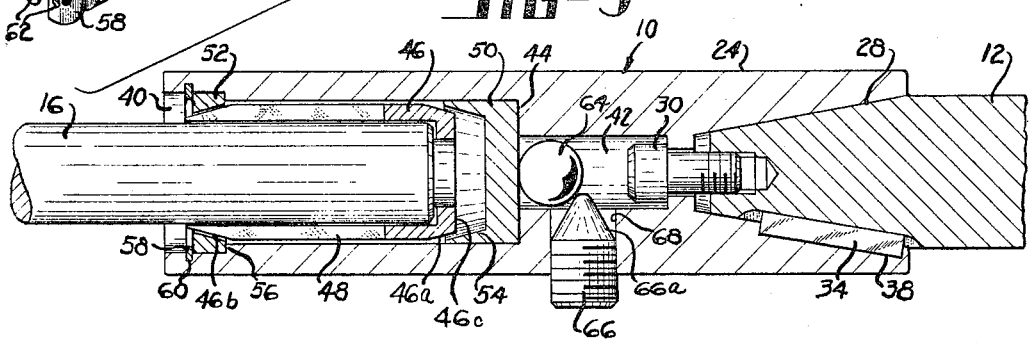
FIGURE 3 is a longitudinal cross-sectional view of the shaft coupling of FIGURE 2 with the drive shaft of FIGURES 1 and 2 connected thereto and a driven shaft in position to be clamped thereto.
Figure 4:
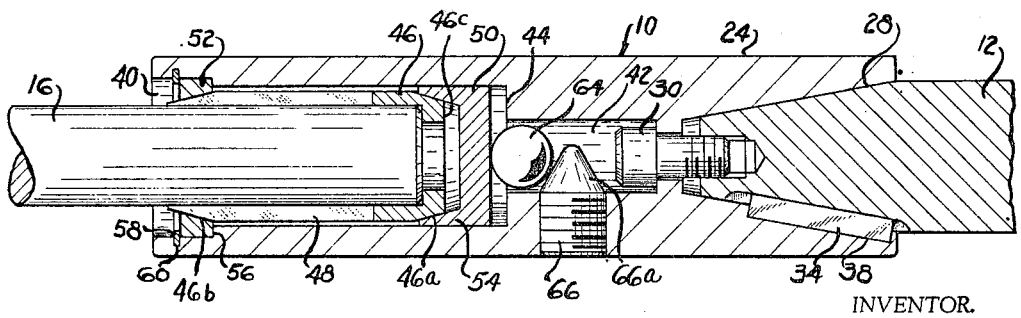
FIGURE 4 is a longitudinal cross-sectional view similar to FIGURE 3 showing the parts after the driven shaft has been clamped to the coupling device.

Referring to FIGURES 2, 3 and 4, the coupling 10 includes a generally cylindrical housing 24 which may be affixed in any suitable manner to the drive shaft 12. As illustrated, one end of the housing 24 may have a conical bore 26 and the free end of the shaft 12 may have a conical taper 28 adapted to be wedged in the bore 26 upon tightening of a screw 30 at the inner end of the bore 26, which is engaged with a threaded opening 32 at the outer end of the shaft 12. Relative rotation of the drive shaft 12 and the housing 24 may be prevented by a key 34 received within a key slot 36 in the shaft 12 and a recess 38 in the bore 26. It is to be understood that the connection of the housing 24 to the shaft 12 illustrated in FIGURES 2, 3 and 4 is only one of a variety of types of connections which could be used. As an alternative, the housing 24 could be integral with the free end of the shaft 12.

Extending into the opposite end of the housing 24 is an enlarged cylindrical bore 40 and a smaller bore 42 coaxial therewith cut in the base, designated 44, of the bore 40. The axis of the bores 40 and 42 is coaxial with the axis of the drive shaft 12 and this axis corresponds with the intended axis of rotation of the driven shaft 16 to be coupled therewith.

A cylindrical shaft clamp element 46, comprising a resilient, generally cylindrical sleeve ring having a plurality of longitudinal slots 48 alternately extending to opposite ends thereof, is confined between a generally cylindrical, cup-shaped sliding wedge member 50 and a fixed wedge member 52 in the bore 40. The sliding wedge member 50 is adapted to slide within the bore 40 and has a disc-shaped base or end portion adapted to abut against the base 44 of the bore 40. The opposite end of the sliding wedge 50 constitutes a cylindrical flange 54 having an inwardly tapered annular interior surface adapted to mate with the inner, tapered end surface, designated 46a, of the element 46. The fixed wedge element 52 is ring-shaped, having a tapered interior surface mating with the outer tapered end surface, designated 46b, of the element 46. To affix the element 52 in the outer end of the bore 40, it is mounted between an annular shoulder 56 near the outer end of the bore 50 and a spring retaining ring 58 located within an annular slot 60 more closely adjacent the outer end of the bore 40. The retaining ring 58 is of the type which normally expands into the slot 60, but may be contracted by means of specially adapted pliers (not shown) cooperating with spaced apertures 62 therein whereupon the retaining ring 58 may be removed from the slot 60.

In FIGURE 3, the driven shaft 16 is illustrated as loosely received within the bore of the clamp element 46, and engaged with an interior base, designated 46c, thereof. In accordance with this invention, the clamp element 46 is tightly compressed against the driven shaft 16 by a clamp actuator comprising a ball element 64 housed within the smaller bore 42 and confined between the base of the sliding wedge 50 and a screw 66, having a conical end surface 66a, threadedly engaged in a bore 68 extending transversely through the housing 24 into the bore 42. Because the end surface 66a has a gradually increasing radius, the ball element 64 is forced against the sliding wedge 50 as the screw 66 is advanced into the bore 42. Thereupon the inner surface of the wedge flange 54 is forced into engagement with the tapered end surface 46a of the element 46. As the sliding wedge 50 is wedged against the tapered end surface 46a, the clamp element 46 is moved to the left, as shown in FIGURES 3 and 4, and both end portions 46a and 46b are wedged or compressed into tight engagement with the shaft 16. At the same time, the cylindrical outer periphery of the wedge flange 54, being somewhat resilient, tightly engages the wall of the bore 40. It will be appreciated that the force applied by the ball element 64 to the sliding wedge 50 is substantially normal to the end surface thereof and that the relationship between the two wedge elements 50 and 52 in cooperation with the tapered surfaces 46a and 46b is such that the element 46 and, accordingly, the shaft 16 are substantially centered with respect to the axis of the housing 24. Because the base portion 46c of the sleeve 46 abuts against the end of the shaft 16, the wedging action described above is quite positive and the location of the shaft 16 relative to the housing 24 can accurately be determined.

It will further be appreciated that the assembly shown in FIGURE 4 may easily be disassembled by first retracting the screw 66 partially out of the housing 24. The driven shaft 16 may then be removed from the clamping element 46. Thereafter, if desired, the entire assembly can be taken apart by removal of the retaining ring 58, the two wedges 50 and 52 and the clamping element 46. In the particular assembly shown in the drawings, the entire coupling device 10 may also be easily removed from the drive shaft 12 upon removal of the locking screw 30 from the threaded opening 32.

Thus, it is seen that the objects of the invention have been achieved. Although a simple screw adjustment similar to a set screw is used, the driven shaft 16 may be rapidly and positively clamped to the housing 24, and the centering problems unusally encountered with set screw type clamps are avoided.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A shaft coupling device including a housing having a bore extending into at least one surface thereof, a portion of the bore adjacent its opening being defined by a tapered surface in the bore, a sleeve within said bore having slots therein whereby said sleeve may be compressed, said sleeve having a longitudinal opening therethrough for receiving a shaft to be coupled to said housing, the outer end of said sleeve having a tapered exterior surface engaging said first mentioned tapered surface, the inner end of said sleeve having a tapered exterior surface, means retaining said sleeve within said bore, a wedge element slidably received within the inner end of said bore, said wedge element having a tapered interior surface portion adapted to engage said tapered exterior surface of said inner end of said sleeve and further having an end surface remote from said sleeve, an adjustable clamping element threaded in said housing and movable along an axis normal to the longitudinal axis of said bore, the inner end of said clamping element having a conical surface concentric with said axis normal to the axis of said bore, and a ball element confined between said conical surface and said end surface of said wedge element whereby said adjustable clamping element may be actuated to vary the position of said conical surface along said axis to increase or decrease the force applied by said ball element upon said wedge element and correspondingly upon said compressible sleeve.

2. A shaft coupling device comprising: a cylindrical housing having an axial bore therethrough; means fixedly connecting one end of said housing to a first shaft with the longitudinal axis of said first shaft aligned with the axis of said bore; and coupling means releasably connecting a second shaft to the other end of said housing, said coupling means comprising a sleeve enclosed within said housing having a plurality of parallel, longitudinal slots therein, some of said slots opening to one end of said sleeve and others of said slots opening to the other end of said sleeve whereby both end portions of said sleeve may be contracted, the exterior surface of said sleeve being tapered at both end portions thereof, said sleeve having an opening therethrough adapted to receive said second shaft; a ring-shaped retaining member having a tapered annular interior surface mating with the tapered exterior surface of one end portion of said sleeve, said retaining member being fixed within said bore adjacent said other end portion of said housing; a wedge element slidably received within the inner end of said bore and having a tapered annular interior surface mating with the tapered exterior surface of the other end portion of said sleeve; an adjustable screw member having a conical end surface extending into said housing along an axis normal to the axis of said bore and spaced inwardly of said housing from said wedge element; and a ball element confined between said conical surface and the inner end surface of said wedge element.

References Cited by the Examiner

UNITED STATES PATENTS

| | | |
|---|---|---|
| 1,271,152 | 7/1918 | Fritts. |
| 1,282,061 | 10/1918 | Folland _____ 279—53 X |
| 1,697,565 | 1/1929 | Horlacher. |
| 2,468,946 | 5/1949 | Sherman. |
| 2,755,094 | 7/1956 | Benjamin _____ 279—51 |
| 2,978,250 | 4/1961 | Abadjieff _____ 279—48 |

FOREIGN PATENTS 736,624   9/1932   France.

CARL W. TOMLIN, *Primary Examiner.*

A. V. KUNDRAT, *Assistant Examiner.*

UNITED STATES PATENT OFFICE
CERTIFICATE OF CORRECTION

Patent No. 3,282,614                                       November 1, 1966

Raymond A. Entrikin

It is hereby certified that error appears in the above numbered patent requiring correction and that the said Letters Patent should read as corrected below.

Column 2, line 13, strike out "ring".

Signed and sealed this 5th day of September 1967.

(SEAL)
Attest:

ERNEST W. SWIDER
Attesting Officer

EDWARD J. BRENNER
Commissioner of Patents